(No Model.)
M. T. BURKET.
CONVERTIBLE RAKE AND FORK.
No. 573,135. Patented Dec. 15, 1896.
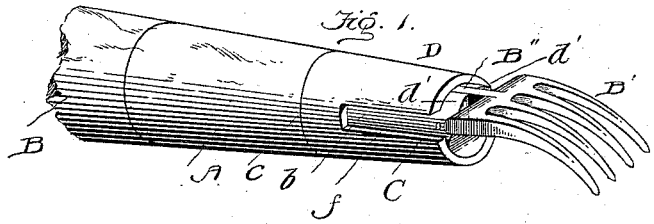
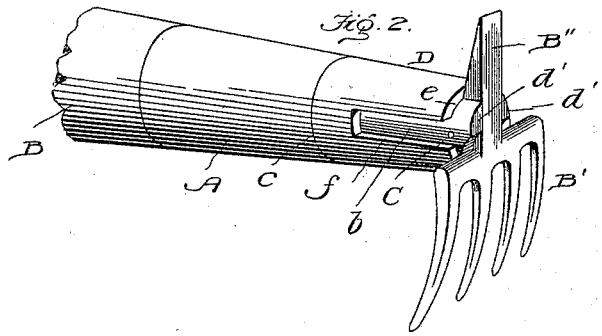
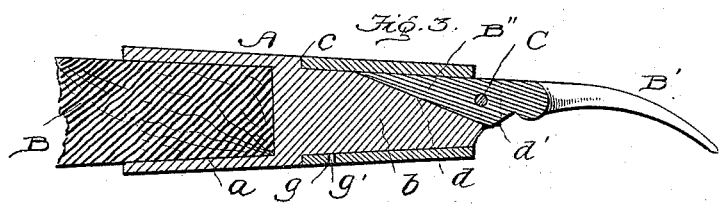
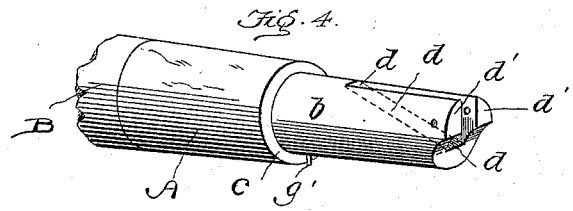
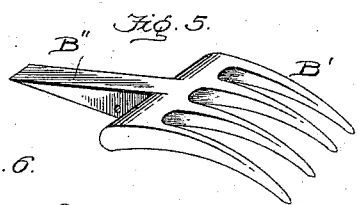
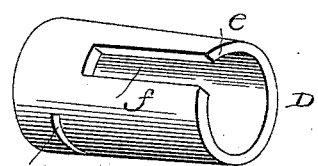
Witnesses:
Marion T. Burket
Inventor
By Edson Bros.
Attys.

UNITED STATES PATENT OFFICE.

MARION TREAVY BURKET, OF LIMA, OHIO, ASSIGNOR OF ONE-HALF TO GEORGE HALL, OF SAME PLACE.

CONVERTIBLE RAKE AND FORK.

SPECIFICATION forming part of Letters Patent No. 573,135, dated December 15, 1896.

Application filed January 17, 1896. Serial No. 575,893. (No model.)

*To all whom it may concern:*

Be it known that I, MARION TREAVY BURKET, a citizen of the United States, residing at Lima, in the county of Allen and State of Ohio, have invented certain new and useful Improvements in Convertible Rakes and Forks; and I do hereby declare the following to be a full, clear, and exact description of the invention, such as will enable others skilled in the art to which it appertains to make and use the same.

My invention relates to improvements in agricultural implements of that class wherein an adjustable rake or fork head is combined with a ferrule and locking-sleeve in a manner to adapt the adjustable head to be turned and locked in a position substantially in alinement with the ferrule and locking-sleeve, which adjustment of the parts enables the device to be used as a pitchfork or a spade, or the head can be adjusted and locked in a position substantially at right angles to the ferrule and sleeve to adapt the implement to be used as a potato-fork, a rake, or a hoe.

The object that I have in view is to so construct the implement that the greatest part of the strain will come upon and be borne by a solid part of the ferrule by which the adjustable head and handle are coupled together instead of subjecting the locking-sleeve to the strain; and a further object is to provide a simple and durable construction which can be easily operated and manufactured at a low cost.

With these ends in view my invention consists of a ferrule adapted to be attached to a suitable handle and provided with a solid end piece, in which is produced a longitudinal recess that is inclined to the axis of the ferrule; an adjustable head formed with a shank which is pivoted to the solid end piece of the ferrule and provided on one of its edges or faces with a bevel corresponding to the inclination of the bottom of said longitudinal recess to adapt the shank to fit snugly in the recess, to bear on the bottom thereof throughout its length, and to lie flush with the face of the end piece when the head is adjusted substantially in alinement with the ferrule; a locking-sleeve fitted on the end piece of the ferrule to partially turn or rotate thereon and provided with a cam-shaped or inclined end next to the pivoted shank and adapted, when the head is turned at right angles to the ferrule, to bind against the inclined end of the shank, and a fixed stop-pin which plays in a straight transverse slot in the locking-sleeve to prevent the sleeve from becoming detached and to limit its partial rotary movement on the ferrule.

To enable others to understand my invention, I have illustrated the same in the accompanying drawings, forming a part of this specification, in which—

Figure 1 is a perspective view of the implement with the adjustable head locked in line with the ferrule and sleeve to enable it to be used as a pitchfork or spade. Fig. 2 is a perspective view of the device with the head adjusted at right angles to the ferrule and locking-sleeve to enable the implement to be used as a hoe, a rake, or as a potato-fork. Fig. 3 is a longitudinal sectional view through the device shown by Fig. 1. Fig. 4 is a detached perspective view of the ferrule. Fig. 5 is a like view of the locking-sleeve, and Fig. 6 is a similar view of the adjustable head.

Like letters of reference denote corresponding parts in all the figures of the drawings, referring to which—

A is the ferrule, which is made from a single piece of metal by casting or in any other suitable way. This ferrule is provided at one end with an interior socket-opening $a$ to receive the handle B, and the other part or end of the ferrule is formed with the solid tenon or end piece $b$. This tenon or end piece is of somewhat less diameter than the socketed end $a$ of the ferrule, so as to produce a shoulder $c$ between the solid end or tenon $b$ and the socketed end $a$ of the ferrule, and in one side of this solid end or tenon $b$ is produced a longitudinal recess or groove $d$. The bottom of this groove or recess is on an incline or slant to the axis of the ferrule, so that one end of the groove opens through the side of the tenon $b$ and the deepest end of the groove opens through the end face of the tenon, thus forming the jaws $d'$, which support the transverse bolt or rivet that pivotally connects the head B to the ferrule A.

The head B is made in form similar to an ordinary spading or pitch fork with a series of tines connected by a web, and this head B is formed with a central shank B', one face or edge of which is beveled on an incline corresponding to the inclination of the bottom of the recess $d$ in the tenon of the ferrule, whereby the shank B' is tapered practically throughout its length or from the head to the free end of the shank. This shank B' is fitted between the jaws $d'$ at the end of the tenon $b$ in a manner to have the beveled edge thereof face toward or next to the inclined bottom of the recess $d$, and through the jaws $d'$ and the shank is passed the bolt or rivet C, which serves to pivotally connect the head B to the ferrule A. The jaws $d'$ extend or project beyond the end face of the solid part of the tenon $b$, as shown by Fig. 4 of the drawings, and these jaws are spaced to lie on opposite sides of the deep end of the inclined recess or groove $d$, so that the shank B'' may fit between the jaws and be pivotally attached thereto by the bolt or pin C in a manner to enable the shank B'' and head B to be turned to a position at right angles to the axial line of the ferrule and handle without interference from the solid part of the tenon. By the described construction of the tenon and the arrangement of the head and its shank as shown the shank is adapted to have the proper turning movement without hindrance from the tenon when adjusting the head to a right-angled position, or when the shank is turned down to lie within the recess $d$ of the tenon to bring the head to a position substantially in line with the tenon and handle. As is usual in this class of implements, the tines B' of the head are curved somewhat in the direction of their length. The working face of the head, or that surface on which the load rests when the structure is used as a fork, is on the same side of the head as the bevel of the tapered shank B''. In other words, the beveled face of the shank B'' and the working face of the toothed head face in the same general direction as shown by Fig. 3. When the implement is used as a fork, the load resting on the working face of the toothed head exerts pressure on the head to force the shank against the solid part of the tenon, and thus the beveled side of the shank B'' bears throughout its length against the inclined bottom wall of the recess $d$ in the tenon, the bearing of the tapered shank against the tenon being clearly illustrated by Fig. 3. This construction relieves the pivot C in a great measure from the strain of the weight or load on the head when the device is used as a pitchfork. Hence the shank bears against a solid part of the tenon from a point opposite to the pivot C clear to the free end of the shank.

D is the locking-sleeve to hold the head B in either of its positions. This sleeve is fitted snugly on the solid end piece or tenon $b$, so as to be free to partially rotate thereon, and the upper end of this sleeve is arranged to bear and ride against the annular shoulder $c$. The other end face of the sleeve D is cut or formed on an incline to produce the cam-shaped face $e$, and in this sleeve is produced two slots $f g$, which lie at right angles to each other, but which have no connection with one another. The slot $g$ is a straight slot parallel to the straight heel end of the sleeve that rides against the shoulder $c$. The length of this straight slot $g$ is equal to the semirotating movement of the sleeve D on the tenon $b$, and in this slot $g$ plays the stop pin or lug $g'$, which is fixed to the tenon $b$ and is adapted to abut against the end walls of the slot $g$ to limit the turning movement of the sleeve on the ferrule A. This pin $g'$ also prevents the sleeve D from having endwise movement on the ferrule A, so that the sleeve is not liable to become displaced. The other slot $f$ is formed longitudinally in the sleeve D to open through its outer cam-formed end face $e$, and this slot $f$ is produced in the sleeve C at such a line and its length is such that the slot $f$ coincides or alines with the recess or groove $d$ in the tenon $b$ when the stop-pin $g'$ limits the turning movement of sleeve D in one direction. The sleeve D is a trifle shorter than the tenon $b$ on which the sleeve is fitted, so that the jaws $d'$ project beyond the cam-formed end of the locking-sleeve.

The operation may be described as follows: To adjust the implement for service as a hoe, rake, or potato-fork, the sleeve D is turned in one direction to bring the slot $f$ thereof into alinement with the recess or groove $d$, the head B is turned at right angles to the ferrule, and during such adjustment of the head its shank B' passes through the slot $f$ in the sleeve, and the sleeve D is now turned in the reverse direction to cause its cam $e$ to ride against the beveled face of the shank B', thereby locking the head B fixedly in the right-angular position shown by Fig. 2. To convert the implement into a pitchfork or as a spading-fork, the sleeve D is turned to bring its slot $f$ into line with the groove or recess $d$ and release the cam $e$ from contact with the shank B', the head is turned on its pivot to bring the head substantially in line with the ferrule and cause the shank B' to enter the recess or groove $d$, so that its beveled face bears against the beveled bottom of said groove and to cause the outer edge of the shank to lie flush with the tenon $b$, and the sleeve D is then reversed to throw its slot $f$ out of alinement with the groove or recess $d$ and bring a solid part of the sleeve opposite the shank B', whereby the sleeve confines the shank B' in the grooved tenon and holds the head firmly in place, as shown by Figs. 1 and 3.

It will be observed that when the head B is adjusted in alinement with the ferrule its shank B' bears firmly against the bottom of the recess or groove and that the shank lies within the recess in the tenon to which the head and shank are pivoted, so that but little strain comes on the sleeve D, but the strain is taken up by the tenon of the ferrule.

The implement is simple and durable in construction, and it is very easily and quickly converted from a fork to a rake or hoe. Its simplicity and the few number of parts all contribute to the cheap manufacture of the implement and to the assembling of the parts together with a minimum of machine or hand labor.

Having thus fully described my invention, what I claim as new, and desire to secure by Letters Patent, is—

In a convertible rake and fork, the socketed ferrule and solid tenon or end piece b, the latter having the longitudinal recess d which extends through one side of the tenon and through the distal end thereof, the bottom wall of said recess being inclined to the longitudinal axis of the ferrule, and said tenon further provided with the spaced jaws d' which project beyond the end face of the tenon, combined with a head B having the tapered shank B'', the working face of the head and the inclined side of the shank facing in the same general direction and said shank being fitted between the jaws d', the pivot C connecting the shank and jaws and lying in a plane with or within the solid distal end of the tenon, and a slotted non-slidable sleeve fitted on the tenon to have a limited turning movement thereon and having the cam-formed face e to ride against the beveled shank B'', substantially as described.

In testimony whereof I affix my signature in presence of two witnesses.

MARION TREAVY BURKET.

Witnesses:
E. N. LEWIS,
THOS. R. SHAW.